Dec. 28, 1937.   J. P. TAYLOR   2,103,566
LIQUID RECORDING MECHANISM
Filed Oct. 7, 1933   2 Sheets-Sheet 1
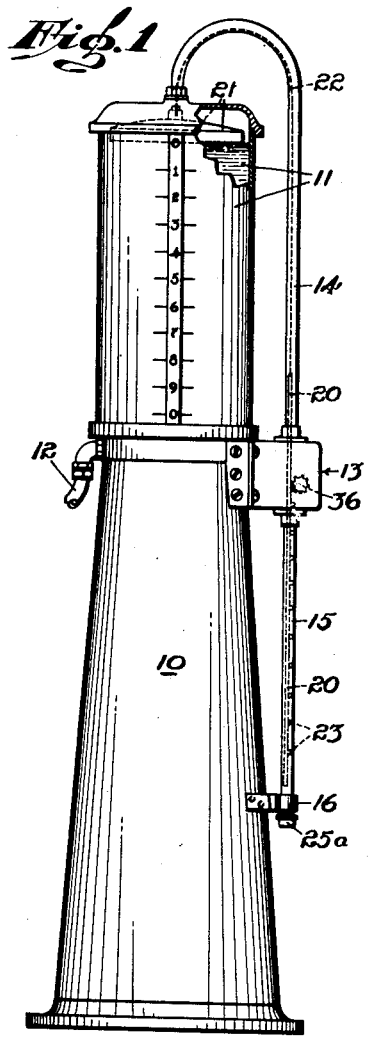
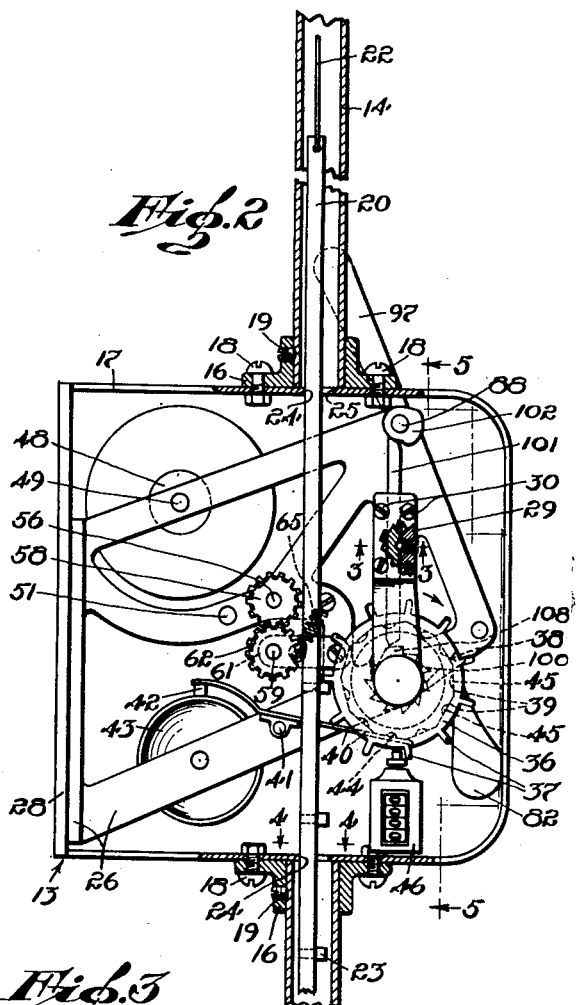
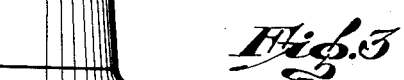
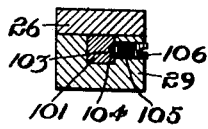
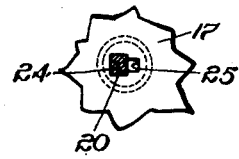
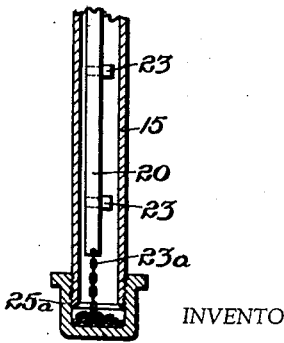
INVENTOR.
James P. Taylor
BY
ATTORNEY.

Dec. 28, 1937.  J. P. TAYLOR  2,103,566
LIQUID RECORDING MECHANISM
Filed Oct. 7, 1933   2 Sheets-Sheet 2
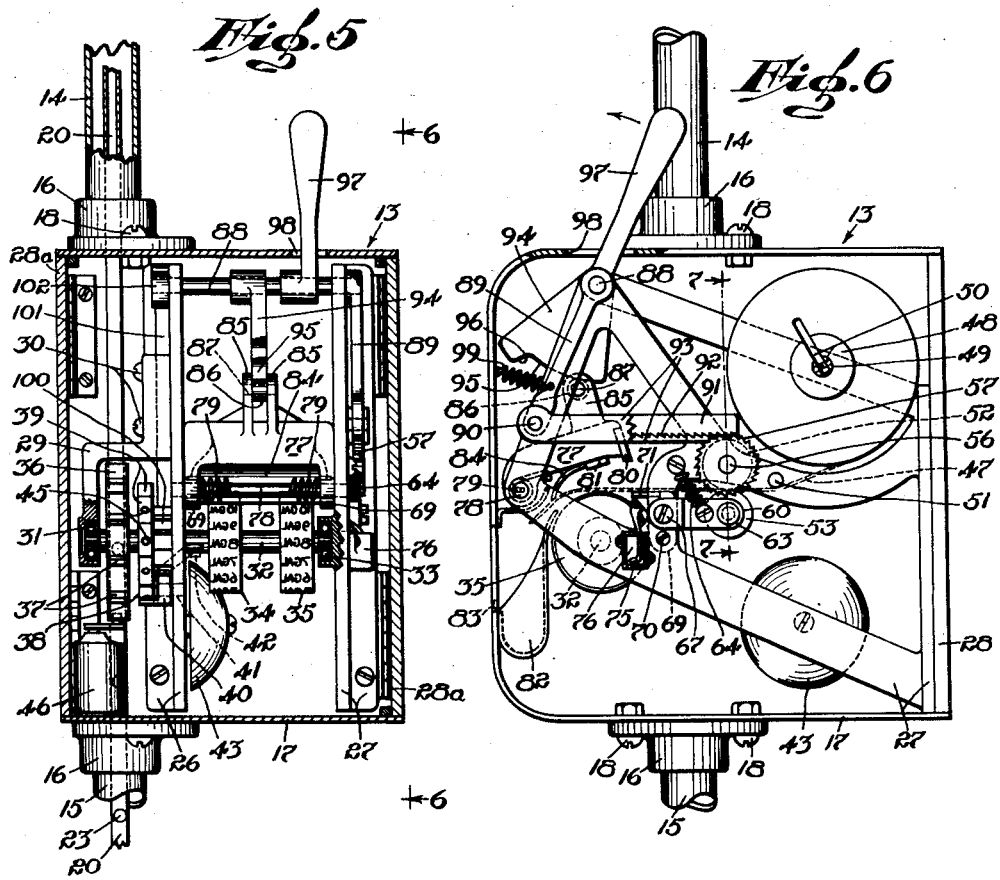
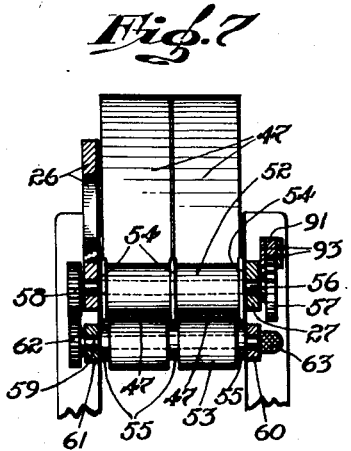
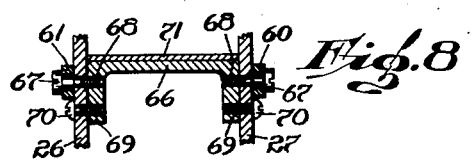
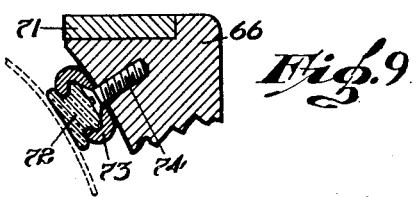
INVENTOR.
James P. Taylor
BY
ATTORNEY.

Patented Dec. 28, 1937

2,103,566

UNITED STATES PATENT OFFICE 2,103,566

LIQUID RECORDING MECHANISM

James P. Taylor, Los Angeles, Calif.

Application October 7, 1933, Serial No. 692,638

2 Claims. (Cl. 234—34)

This invention relates to liquid recording mechanism for determining the quantity of liquid moved from one place to another and for recording the same.

Among the salient objects of the invention is the provision of a device for measuring the quantity of liquid moved from one place to another and for producing a printed record of said measurement; to further provide such a device which is float-actuated.

Additional objects of the invention are, to provide an apparatus of the character referred to, which comprises a float-actuated indicating means for measuring the quantity of liquid moved; to provide means for recording the quantity of liquid moved; to further provide manually operable means for actuating said recording means and for ejecting the record made thereby; and to further provide in combination with said recording mechanism means for locking the indicating mechanism.

Further objects of the invention are, to provide in combination with an indicating means for measuring the quantity of liquid moved from one place to another, means for periodically producing an audible signal during the movement of said liquid and to further provide a recording counter device for indicating the accumulated quantity of liquid moved.

Still further objects are to provide in combination with an indicating mechanism for measuring the quantity of liquid moved, one or more strips of material for receiving the record set up by the indicating mechanism; to provide means for automatically feeding said strips into recording position and to further provide means for producing a printed record on the strips and for cutting off the portion of said strips receiving said record.

Another object is the provision of an apparatus of the character referred to which comprises a minimum number of operating parts and which is exceptionally economical to manufacture.

This invention possesses many other advantages and has other objects which may be made more easily apparent from a consideration of one embodiment thereof. For this purpose I have shown one form in the accompanying drawings and forming part of the present specification. I shall now proceed to describe this form in detail, which illustrates the general principles of my invention; but it is to be understood that this description is not to be taken in a limiting sense, since the scope of the invention is best defined in the appended claims.

Referring to the accompanying drawings:

Figure 1 is an elevation of a gasoline pump with my invention shown embodied therein.

Figure 2 is an enlarged view of the liquid register with one door removed showing the indicating mechanism provided by my invention.

Figure 3 is an enlarged transverse sectional view taken as indicated by line 3—3 of Figure 2 and showing the means of locking the indicating mechanism.

Figure 4 is a fragmentary sectional view taken on line 4—4 of Figure 2 and showing one guide opening through which the float-actuated member of the indicating mechanism is guided.

Figure 5 is a sectional view taken as indicated by line 5—5 of Figure 2.

Figure 6 is a view taken on line 6—6 of Figure 5 with the door removed showing the recording apparatus.

Figure 7 is a view taken on line 7—7 of Figure 6 and showing the feed rollers for the recording strips, certain parts being shown in section and others in elevation.

Figure 8 is a fragmentary transverse sectional view through the stationary member of the shearing mechanism and means for supporting the same and Figure 9 is an enlarged fragmentary sectional view showing the stationary blade support with the inking pad mounted thereon.

Applicant's apparatus might be used in a number of ways where it is desired to measure the quantity of liquid moved from one place to another and to produce a printed record of such measurement. He finds his apparatus particularly adaptable for use in connection with gasoline service pumps, for checking or verifying the quantity of gasoline dispensed therefrom from time to time and for producing upon each withdrawal, one or more records of the quantity of gasoline moved. Said records serve as a check for both the customer and proprietor.

For purposes of explanation applicant has shown his apparatus in connection with a gasoline service pump of the type employing a glass dispensing reservoir from which gasoline is dispensed to purchasers and into which gasoline is supplied from a main tank, usually located under the ground. Applicant's apparatus is particularly useful in this type of pump, because no accurate means is provided for dispensing a predetermined quantity of gasoline from the dispensing reservoir. The accuracy of the quantity of gasoline dispensed is dependent upon the skill of the operator in manipulating a hand operated dispensing valve, to bring the gasoline level in the dispensing reservoir to a stop exactly on the measuring indications appearing on the face of said reservoir.

Referring to the accompanying drawings and particularly to Figure 1 thereof, numeral 10 represents a pump of the class heretofore described, which includes a glass dispensing reservoir 11 with the usual measuring graduations and indicia appearing thereon and a dispensing hose 12 leading from said dispensing reservoir. Mounted in a convenient place on the side of the pump is a unit generally designated 13, which contains the indicating and recording mechanism provided by applicant's invention. For purposes of explanation said unit will hereinafter be generally referred to as a meter or register. A tube 14 connects the upper end of the meter with the top of the dispensing reservoir as shown in Figure 1 and a further tube 15 is connected to the bottom of the meter and is supported at its lower end by a bracket 16 on the pump 10. Figure 2 shows the means of supporting the tubes 14 and 15. The ends of said tubes extend into supports 16—16 which are mounted on the top and bottom of the register housing 17 by bolts 18—18. Said tube ends are secured therein as by the aid of set screws 19—19.

The measuring or indicating mechanism within the meter housing 17 and hereinafter fully described, is actuated by a float-operated member 20 which passes through the housing and which is contained in the tubes 14 and 15. The upper end of the said member is connected to a float 21 in the dispensing reservoir as by the aid of a flexible connecting member 22 passing through the tube 14. The operating member 20 moves up and down in response to the actuation of the float 21 when the liquid level in the dispensing reservoir is varied. It is provided with a series of actuating fingers or lugs 23 along its length and is guided in its vertical movement in the following manner. Said member is preferably square in cross section and is restrained against rotative movement by passing through square openings 24—24 formed in the top and bottom of the meter housing 17 as shown clearest in the fragmentary view of Figure 4. A smaller offset opening 25 communicating with the square opening 24 permits the operating fingers 23—23 to pass.

In the form of the apparatus shown, applicant prefers to provide means for compensating for any variation in float displacement which might result from the variable weight thereon produced by the movement of the flexible connecting element 22 into and out of the reserve reservoir. He accomplishes this in the present instance by connecting a flexible compensating element 23a (Figure 2) in the form of a chain or the like, on to the lower end of the float-actuated member 20. The weight per unit length of said element 23a is the same as that of the flexible member 22 which connects the upper end of the member 20 and the float 21. When the float is up and the member 20 in its lowermost position the flexible compensating element 23a is contained in a hollow cap 25a on the lower end of the tube 15. Thus it will be seen how a perfect counter-balance is produced as the flexible connecting element 22 is paid into the reserve reservoir when the float descends and the flexible compensating element 23a simultaneously paid out of the cap 25.

The indicating mechanism operated by the float actuated rod is supported within the meter housing 17 by spaced frame members 26 and 27 which are secured to the base 28 of said housing. Doors 28a are hingedly connected to either side of the housing. An extended bracket 29 is supported by the frame member 26 as by the aid of screws 30—30 and is provided at its lower end with a ball bearing structure 31 into which one end of the indicating shaft 32 is journaled, the other end of said shaft being journaled in a similar ball bearing structure 33 in the opposite frame member 27. Spaced indicating cylinders or counter wheels 34 and 35 are supported on the shaft 32 between the supporting frame members and are adapted to rotate with said shaft. Said counter wheels are provided on their faces with type, from which printed records are taken in a manner hereinafter fully described. An operating wheel 36 is fixedly mounted on the indicating shaft 32, between the frame member 26 and the extended portion of the supporting bracket 29. It is provided around its periphery with a plurality of projecting fins 37—37 against which the operating fingers 23—23 of the float actuated rod engage, to rotate the shaft 32 and its accompanying type wheels 34 and 35.

It will thus be seen that when the float moves downwardly in the dispensing reservoir 11, the operating rod 20 is moved correspondingly upward and the operating fingers thereon engage with the fins on the operating wheel 36, to rotate the counter wheels to the correct position for recording the exact quantity of liquid moved. Referring to Figure 2; when the operating rod 20 moves upwardly in response to the downward movement of the float, the counter wheels are rotated in a clockwise direction as indicated by the arrow, until the withdrawal of liquid is discontinued, at which time they are in a recording position indicative of the quantity of liquid withdrawn. When liquid is again admitted to the reserve reservoir the float of course rises and the operating rod correspondingly lowers, to move the counter wheels in a reverse direction. The indicating apparatus heretofore described is designed in such a manner that the counter wheels are rotated a predetermined distance every time a gallon of gasoline is moved in the dispensing reservoir. In the present instance the dispensing reservoir is shown as having a capacity of ten gallons and the counter wheels are rotated one tenth of a revolution whenever a gallon of liquid is moved.

Applicant prefers to provide an audible signal every time a gallon of gasoline has been withdrawn from the dispensing reservoir. He accomplishes this by fixedly mounting a wheel or cylinder 38 on the indicating shaft 32. Said cylinder is provided with a number of flat surfaces 39—39 corresponding in number to the gallons of gasoline held by the dispensing reservoir. A clapper arm 40 is pivotally connected at 41 to a portion of the frame member 26, as shown clearest in Figure 2. One end of said arm engages with the cylinder 38 and is urged thereagainst by the weight of a clapper 42 on the opposite end thereof, which serves to ring the bell 43. A projection 44 is provided on that end of the clapper arm engaging the drum, as shown clearest in Figure 2. It is adapted to drop into grooves or dents 45—45 in the flat faces of the cylinder as the same is rotated, for the purpose of ringing the bell upon each withdrawal of a gallon of gasoline from the reservoir. The flat faces of the cylinder serve to raise the projection 44 out of the grooves 45—45. Applicant has provided a counter 46 for determining the accumulated gallons of gasoline withdrawn from the pump. It is actuated in the present instance by the operating wheel 36. Such counters are old in the art and accordingly the one shown does not form a part of the present invention other than it appears in the combination.

Reference is had particularly to Figures 5 and 6 which show the recording and ejecting mechanism provided by applicant's invention. The provision of the two similar counter wheels permits applicant to produce duplicate records without resorting to the more complicated system of using transfer ribbons and the like. In the present instance applicant prefers to produce the records on separate strips of paper or other suitable material 47—47, which are passed over the indicating or counter wheels 34 and 35. Said strips are wound on cores 48 which are revolubly supported on a spindle 49 extending from the supporting frame 27. The rolls of strip material are removably retained on the spindle 49 by a commonly employed pivoted latch 50. The strips pass under a guide rod 51 supported between the frame members and through feed rollers 52 and 53, from whence they are fed over the stationary blade of a severing mechanism and onto the counter wheels 34 and 35.

The feed rollers 52 and 53 are best shown in Figure 6. The upper roller 52 is provided with spaced discs 54—54 which cooperate with corresponding grooves 55—55 in the lower roller 53, to form guide means for the strips of recording material. The upper roller 52 is fixedly mounted on a shaft 56 which passes through the spaced frame members 26 and 27. Said shaft carries on one end a ratchet wheel 57 and on the other end thereof a gear 58. The lower feed roller 53 is fixedly mounted on a shaft 59, supported at either end by arms 60 and 61, which are pivotally connected to the spaced frame members 27 and 26 respectively in a manner hereinafter described. Said shaft extends through the supporting arms and carries on one end a gear 62, which is adapted to engage with the gear 58 to provide a positive drive for the feed rollers. A knurled member 63 is provided on the opposite end of the shaft 59 and serves as a convenient grasping means by which to separate the lower roller from the upper one when the recording strips are manually threaded therebetween. The lower feed roller 53 is yieldingly urged against the upper feed roller 52 as by the aid of coil springs 64 and 65 secured to the supporting arms 60 and 61 and the frame members 27 and 26.

A support 66 for the stationary blade of the severing mechanism is supported between the frame members as shown clearest in Figure 8. Screws 67—67 pivotally support the arms 60 and 61 and are provided with reduced threaded portions 68—68 which pass through the frame members and into depending lugs 69—69 on the blade support 66. Said support is further secured by screws 70—70 passing through the frame members and into the lugs 69—69. A blade 71 is mounted on said support as shown clearest in Figures 6, 8, 9 and the strips of recording material pass thereover in a manner best shown in Figure 6.

Many ways might be employed for inking the counter wheels. However, in the form shown said counter wheels are adapted to drag over an ink pad 72, shown clearest in Figure 9. Said pad is retained in a channel member 73 which is secured to the blade support as by screws 74—74. Ink is supplied to the ink pad by the aid of a wick 75 connected thereto and extending into an ink reservoir 76 supported on the frame member 27, all of which is clearly shown in Figure 6 of the drawings.

The recording mechanism provided by applicant's invention is best shown in Figures 5 and 6. A recording hammer 77 is pivotally supported between the frame members 26 and 27 on a rod 78 which is fixedly supported in said frame members. The free end of the hammer is normally urged upwardly to a non-recording position as shown in Figure 6, by the aid of coil springs 79—79 on either end of the supporting rod 78. One end of said springs is secured to the rod as by passing through an opening therein and the other ends thereof are bent under the sides of the hammer as shown in Figure 6, thus urging it upwardly. A blade 80 is carried on the free end of the hammer 77 and is adapted to cooperate with the stationary blade 71 for severing the strips of recording paper. A striker 81 carried by the hammer, serves to record on said strips, the indications set up by the counter wheels. The printed records drop into a pocket 82 from which they can be removed through a window 83 in the meter housing. A curved member 84 on the hammer serves to both guide the records into the pocket and enhance the ejection thereof. The edge of the member bearing against the records can be roughened so as to slightly bite the same to urge them off of the counter wheels. Upwardly extending lugs 85—85 are carried by the hammer 77 and a roller 86 is revolubly supported therebetween on a pin 87.

Applicant prefers to provide manually operated means for feeding the recording strips into recording position and for operating the hammer 77. A revoluble shaft 88 is supported by the frame members 26 and 27. One end thereof extends through the frame member 27 and carries an arm 89 which turns with the shaft. The lower end of said arm is pivotally connected at 90 to a ratchet bar 91 which has ratchet teeth 92 that are adapted to cooperate with the ratchet wheel 57 on the shaft of the upper feed roller 52. Guide strips 93—93 are secured to either side of the ratchet bar 91 as shown clearest in Figure 7. They extend below the ratchet teeth on said bar and serve to guide the ratchet bar 91 on the ratchet wheel 57. An operating member 94 is mounted on the shaft 88 to turn therewith. It is provided with an arcuate surface 95 against which the roller 86 on the hammer 77 is yieldingly urged. Said surface is provided with an offset portion 96. An operating lever 97 is fixed on the shaft 88 and extends through an opening 98 in the meter housing. The operation of the mechanism just described is as follows. When the operating lever is moved in the direction indicated by the arrow in Figure 6 the arm 89 on the end of the shaft 88 moves the ratchet bar, and the ratchet teeth thereon engaging with the teeth on the ratchet wheel causes the feed rollers to rotate. The recording strips threaded between said rollers are accordingly fed over the stationary blade 71 and onto the counter wheels 34 and 35. During the movement just described the arcuate surface 95 of the operating member 94 passes over the roller 86 on the hammer. The hammer remains in substantially the same position until the roller strikes the offset portion 96, at which time the hammer is forced downwardly. It will be seen in Figure 6 that the blade supported on the hammer extends below the bottom of the striker 81. Accordingly the strips of recording paper are severed, slightly before the records are printed. When the operating lever 97 is released the coiled spring 99 forces the mechanism back to normal position. During this reverse movement the ratchet teeth on the ratchet bar slide over the teeth on the ratchet wheel without moving the same.

When a quantity of gasoline has been withdrawn from the reserve reservoir and a printed record produced from the record set up by the counter wheels, it is an important feature of applicant's invention to render said counter wheels inactive until gasoline is again admitted to the reserve reservoir. This is accomplished in the following manner. As shown clearest in Figures 2 and 5, a ratchet wheel 100 is fixedly mounted on the shaft 32 which carries the counter wheels. A rod 101 is slidably supported in a slot in the bracket 29 and adjacent the frame 26, as shown clearest in Figure 3. It is adapted to be moved into engagement with the ratchet wheel 100 when the recording mechanism is actuated. This is accomplished by a cam member 102 which is secured to one end of the shaft 88. When the lever 97 is operated the cam forces the rod 101 into engagement with the ratchet wheel 100. The counter wheels are accordingly locked and rendered incapable of being actuated by the float operated member 20, to measure or indicate the withdrawal of additional liquid from said reservoir until liquid is again admitted thereto. When liquid is again admitted to the reservoir the float rises and the float actuated member 20 is moved in a reverse direction. The ratchet wheel and the end of the rod 101 are of such construction that the shaft carrying the counter wheels is permitted to move in a reverse direction, or back toward a non-recording position.

Means is provided for positively holding the operating rod 101 in both operative and inoperative position. The drawings show said rod in an inoperative position. It is held therein as shown clearest in Figure 3. A groove 103 is provided in the rod 101 into which a ball 104 is yieldingly urged as by a spring 105. Said spring is retained in an opening in the bracket 29 as by a screw 106. When the rod is forced downwardly the ball 104 is urged out of the groove 103. However when the rod has moved downwardly a sufficient distance to engage with the ratchet wheel, the ball 104 is forced into another groove 107 in the rod to positively hold it in a locking position.

When the float 21 is completely up, in the liquid reservoir as shown in the drawings, and the type or counter wheels are in the zero position as shown, both the recording mechanism and locking mechanism are rendered inactive. This is accomplished by providing a solid portion 108 on the ratchet wheel 100, which restrains the slidable rod 101 from moving downwardly into engagement with the teeth of said ratchet wheel. Thus a printed record cannot be made until at least one gallon has been withdrawn from the liquid reservoir and the solid portion 108 of the rachet wheel is turned away from the rod 101.

It is believed that the operation of applicant's apparatus will be clear from the foregoing description. While only one form of the invention is shown and described, applicant is aware of the fact that changes in the details can be made without departing from the true spirit thereof, and he does not therefore, limit his invention to the showing made, except as he may be limited by the hereto appended claims.

I claim:

1. In a liquid dispensing and recording apparatus embodying a liquid reservoir having a float therein with operating connections from the float to a type wheel for setting the wheel in accordance with the variations in liquid level within said reservoir, and in which means are provided for producing an impression from the type wheel; the combination, of means responsive to the actuation of said means for releasably locking the type wheel, said operating connections being responsive to a refilling of the reservoir for acting upon the type wheel to release the same and move it into initial position.

2. In a liquid dispensing and recording apparatus embodying a liquid reservoir having a float therein with operating connections from the float to a type wheel for setting the wheel in accordance with the variations in liquid level within said reservoir, and in which means are provided for producing an impression from the type wheel; the combination, of means for interlocking the operating connections and the type wheel upon actuating said recording means for preventing the continued movement of said type wheel in an additive direction, said operating connections being operable when the container is refilled with liquid for acting on said type wheel to effect its release and movement into its initial position.

JAMES P. TAYLOR.